(12) United States Patent
Polevoy et al.

(10) Patent No.: US 7,694,363 B2
(45) Date of Patent: Apr. 13, 2010

(54) FOUNDATION HEADBOARD BRACKET SYSTEM FOR BED

(75) Inventors: Richard S. Polevoy, Teaneck, NJ (US); Paul Eric Carlson, Skaneateles, NY (US)

(73) Assignee: Finger Lakes Intellectual Property, LLC, Teaneck, NJ (US)

( * ) Notice: Subject to any disclaimer, the term of this patent is extended or adjusted under 35 U.S.C. 154(b) by 732 days.

(21) Appl. No.: 11/354,257

(22) Filed: Feb. 14, 2006

(65) Prior Publication Data

US 2006/0195983 A1 Sep. 7, 2006

Related U.S. Application Data

(60) Provisional application No. 60/652,987, filed on Feb. 15, 2005.

(51) Int. Cl.
*A47C 19/02* (2006.01)
(52) U.S. Cl. .................. 5/288; 5/282.1; 5/53.1
(58) Field of Classification Search .................. 5/288, 5/285, 282.1, 200.1, 201, 53.1
See application file for complete search history.

(56) References Cited

U.S. PATENT DOCUMENTS

| | | | |
|---|---|---|---|
| 1,288,544 A | 12/1918 | Farrow | |
| 2,579,206 A * | 12/1951 | Sands et al. | 16/353 |
| 2,745,116 A | 5/1956 | Jackson | |
| 2,907,054 A * | 10/1959 | Sark | 5/298 |
| 3,009,170 A * | 11/1961 | Akram | 5/8 |
| 3,061,870 A * | 11/1962 | Giannini, Sr. | 16/261 |
| 3,644,948 A | 2/1972 | Fredman | |
| 3,740,776 A * | 6/1973 | Lazarus | 5/296 |
| 3,748,668 A * | 7/1973 | Rudin | 5/296 |
| 4,822,223 A | 4/1989 | Williams | |
| 4,856,127 A | 8/1989 | Lenger | |
| 5,163,968 A * | 11/1992 | Lafferty | 5/200.1 |
| 5,522,101 A * | 6/1996 | Yeh | 5/9.1 |
| 5,694,656 A | 12/1997 | Huang | |
| 6,564,401 B1 | 5/2003 | Weinman | |
| 2006/0195983 A1* | 9/2006 | Polevoy et al. | 5/288 |

\* cited by examiner

*Primary Examiner*—Robert G Santos
(74) *Attorney, Agent, or Firm*—Klauber & Jackson, LLC

(57) ABSTRACT

A bracket system for attaching a headboard to a bed foundation. The bracket system includes a foundation bracket affixed to the bed foundation and a slide bracket affixed to the headboard. Each of the brackets is generally U-shaped having a pair of side plates extending outwardly therefrom. The dimensions and spacing of the side plates enables one bracket to interfit or nest within the other bracket. A securing device passes through both the foundation bracket and the slide bracket to secure the brackets together and affix the headboard to the bed foundation. In an alternate embodiment, the foundation brackets have a lower plate and side plates extending upwardly therefrom and are affixed to the head corners of the bed foundation. The slide bracket is affixed to the headboard and then to the directly to the bed foundation through the foundation bracket. In a further embodiment, the foundation bracket is eliminated.

14 Claims, 10 Drawing Sheets

FOUNDATION HEADBOARD BRACKET SYSTEM FOR BED

REFERENCE TO RELATED APPLICATIONS

The present patent application is based upon and hereby claims priority to Provisional patent application Ser. No. 60/652,987, filed Feb. 15, 2005.

BACKGROUND OF THE INVENTION

The present invention relates to a means of attaching a bed foundation to a headboard in the assembly of a bed and, more particularly, to a foundation headboard bracket system that provides a versatile, bracket system for firmly affixing a bed foundation to a headboard.

In general, there are a number of differing types of bed frames and constructions used in the assembly and formation of a bed. One typical construction is with the use of a bed frame where there are side rails having cross members that are pivotally affixed at or proximate to the ends of the side rails. During shipment, for convenience, the cross members are in a position parallel to and adjacent to the side rails and, during the assembly of the bed frame, those cross members are pivoted outward from that parallel orientation to a position at about a ninety degree angle with respect to the side rails and the free ends of the opposed cross members are affixed together forming a generally rectangular frame that receives the box spring and a mattress that rests atop of the box spring. That bed frame construction provides support for the box spring generally along the entire sides of the box spring. There are brackets at the head of the bed frame that are used to secure the bed frame to a headboard and the brackets normally have elongated openings to allow some adjustability in affixing the bed frame to the headboard since the standard bed frame and standard headboard have mounting holes that may vary in width and height. In most cases, however, the location of such holes conform to a standard minimum and maximum range for both the width (vertical) and height (horizontal) in order for the slots in the bed frame to align with the holes in the headboard to allow screws to pass therebetween in affixing the bed frame to the headboard.

Another construction of a bed, however, involves the use of a bed foundation. The bed foundation basically replaces the normal box spring and has reinforced sides, generally made of wood 2×4's, such that the bed foundation does not require support along the sides but only at the corners of the bed foundation. As such, there are metal plates in the shape of truncated triangles, that are located beneath each of the four corners of the bed foundation so that legs can be screwed into threaded holes in the metal plates to thereby allow the bed foundation to be basically self-supporting on the four legs. At the front and rear ends of the bed foundation, there are threaded inserts that allow the attaching of adjustment brackets that are used to align and attach the headboard and footboard to the bed foundation to obtain the correct alignment, vertically and horizontally, in the same manner as with the previously described bed frame.

For example, at the front end of the bed foundation, there is normally a pair of vertically spaced apart threaded inserts located proximate to both of the outer edges of the front end of the bed foundation. The adjustment bracket is therefore affixed to the bed foundation by machine screws inserted into the threaded insets with some limited horizontal adjustment and the typical adjustment bracket then also has one or more vertical slots that are used in attaching the headboard to the adjustment bracket by means of bolts that pass through those vertical slots, through the headboard and secured by nuts.

There are certain difficulties, however, in the simple attachment of the headboard to a bed foundation through the use of the flat, adjustment bracket. One of the difficulties lies in the basic construction of the typical adjustment bracket itself which is a relatively weak, flat stamped metal construction and is simply not strong enough to carry out the task of affixing the bed foundation to the headboard, particular where many of the bed foundations are sold with more expensive, heavy, decorative headboards creating consider leverage and joint strain on the adjustment bracket and causing a premature failure of the connection between the bed foundation and the headboard.

In addition there is a difficulty in carrying out the connection between the adjustment bracket and the headboard in that the adjustment bracket is affixed directly to the bed foundation and there is, therefore, very limited access to the side of the adjustment bracket that faces the bed foundation. Thus, that attachment is unlike the attaching of a bed frame to a headboard since the bed frame is normally attached to the headboard prior to the box spring being placed on the bed frame so that there is full access to that to the rear facing headboard bracket on the bed frame for the insertion of bolts or other fastening devices. As such, with a bed foundation type of bed, it is generally quite difficult and cumbersome to thread a bolt through the adjustment bracket and through the headboard holes due to the rather limited space in which to thread the bolts through the adjustment bracket.

Accordingly, it would be advantageous to have an improved headboard bracket system for affixing a bed foundation to a headboard that facilitates or eases making that connection while providing a strong, rigid affixation therebetween.

SUMMARY OF THE INVENTION

Therefore, in accordance with the present invention, there is a headboard bracket system that is used to affix a headboard to a bed foundation and which includes a foundation bracket that is affixed by standard machine screws to the front end of a bed foundation by screwing the machine screws into the vertically spaced apart threaded inserts that are conventionally provided in bed foundations. The foundation bracket is a generally U-shaped component having a base plate that fits flush against the front end of the bed foundation and has laterally spaced apart side plates that extend outwardly therefrom a predetermined horizontal distance apart.

A slide bracket is somewhat similarly affixed to the headboard and the slide bracket is also constructed as a generally U-shaped component having a base plate that sits flush again the headboard and with laterally spaced apart side plates that extend outwardly therefrom a predetermined horizontal distance apart. The actual affixation between the foundation bracket and the bed foundation as well as the slide bracket and the headboard provides slotted openings to allow some adjustment of both the foundation bracket and the headboard bracket in order to properly align the eventual affixation between the bed foundation and the headboard.

As such, in order to affix the headboard to the bed foundation, the foundation bracket and the slide bracket are affixed together and that affixation is accomplished by nesting one of the brackets into the other. In the embodiment described, the lateral side plates of the slide bracket fit adjacent to and outwardly of the lateral side plates of the foundation bracket. When so nested, securing devices, such as carriage or other bolts, pass laterally between both brackets in order to secure those brackets together. With two sets of brackets, that is, a foundation bracket and a slide bracket located at opposed ends of the head end of the bed foundation, the eventual affixing of the headboard to the bed foundation results in a solid connection that can be carried out relatively easily.

It will be noted that the present invention is described with respect to a headboard for a bed, however, as will be clear, the bracket system is equally applicable to a footboard and its affixation to the foot end of a foundation bed. In addition, while the present bed foundation is described as having threaded inserts that mate with machine screws, since bed foundations commonly have such threaded inserts, the present bracket system is applicable to a bed foundation where there are no threaded inserts or threaded inserts that are not used and wood screws, bolts and nuts or other securing devices are used to secure a foundation bracket to the bed foundation.

Other features of the bracket system of the present invention will become more apparent in light of the following detailed description of a preferred embodiment thereof and as illustrated in the accompanying drawings.

DETAILED DESCRIPTION OF THE INVENTION

Figure 1:
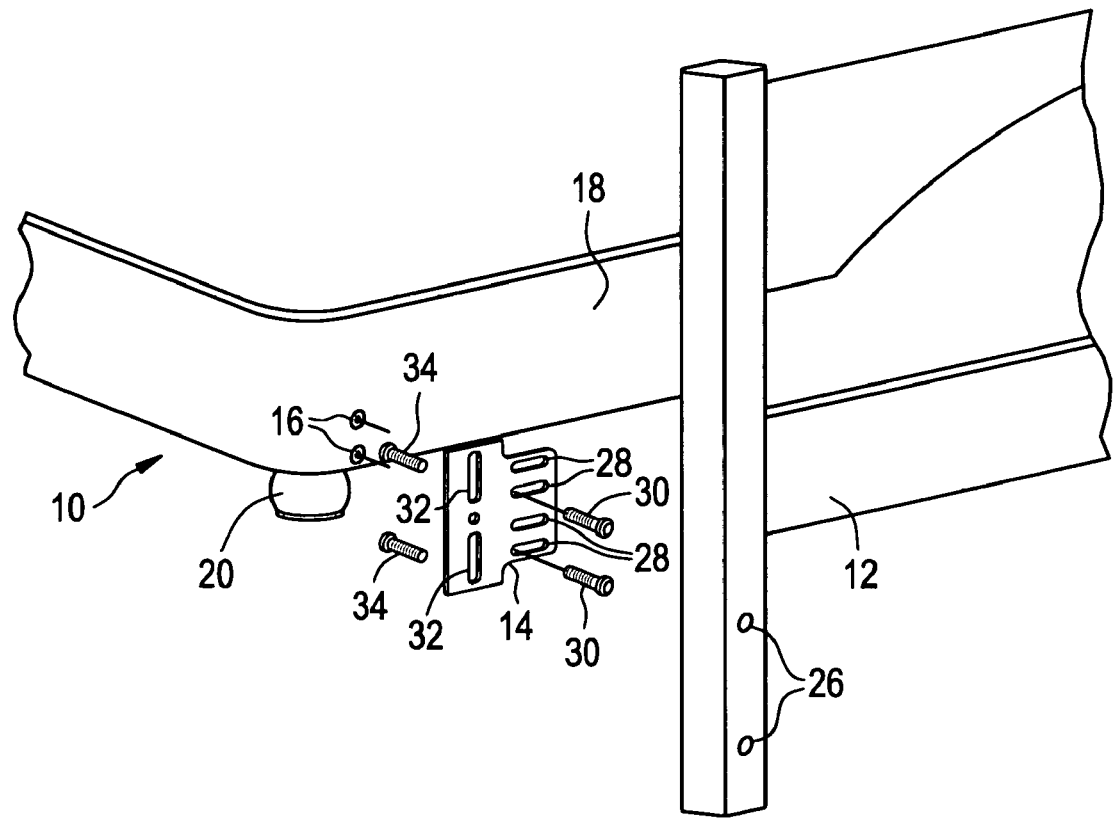
FIG. 1 is an exploded view of a conventional bracket system for affixing a bed foundation to a headboard.

Referring now to FIG. 1, there is shown an exploded view of a conventional bed foundation 10 in position to be affixed to a headboard 12. As can be seen, there is also an adjustment bracket 14 that is positioned intermediate the bed foundation 10 and the headboard 12 and which is used to complete the affixation of the bed foundation 10 to the headboard 12. There is a pair of threaded inserts 16 shown in FIG. 1 that are vertically spaced apart and a similar pair of threaded inserts are located (not shown) at the opposite side of the head end 18 of the bed foundation 10 and the location and type of threaded inserts 16 are conventional on bed foundations.

Figure 1A:
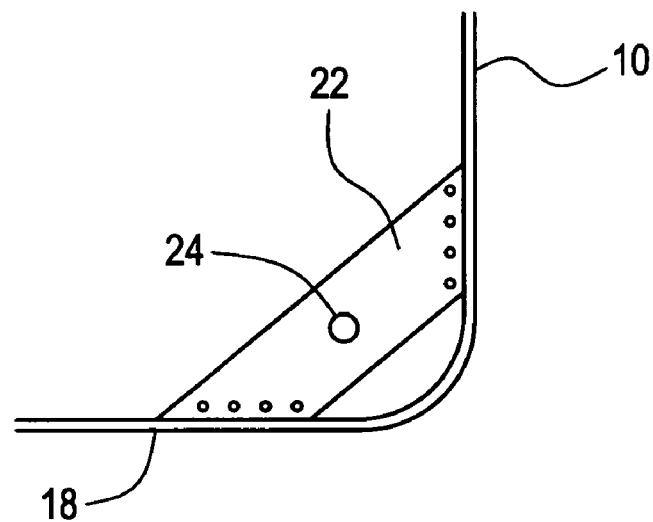
FIG. 1A is a bottom view of a corner of the bed foundation of FIG. 1 illustrating the location of a conventional corner plate.

The bed foundation 10 also has a leg 20 extending downwardly from the bed foundation 10 in order to maintain the bed foundation 10 above the floor and there are generally four legs, one at each corner of the generally rectangular bed foundation 10. Turning briefly to FIG. 1A, taken along with FIG. 1, there is a bottom view of a corner of the bed foundation 10 and, as can be seen, the legs 20 are conventionally screwed into a triangular plate 22 having one apex truncated that is provided underneath and at all four corners of the bed foundation 10. Each of the triangular plates 22 generally have a threaded hole 24 into which a threaded shaft on each of the legs 20 can readily be screwed to fasten the legs 20 to the bed foundation 10.

There are two holes 26 also vertically spaced apart located in the headboard 12 for a use that will be later explained. The adjustment bracket 14 has a plurality of horizontal elongated slots 28 (four are shown in the embodiment of FIG. 1) that align generally with the threaded inserts 16 in the bed foundation 10. Two of the horizontal elongated slots 28 are selected in conjunction with either of two differing leg heights that are conventionally used with a bed foundation 10. Therefore, in the assembly of the bed foundation 10 to the headboard 12, there are two machine screws 30 that pass through the two selected horizontal elongated slots 28 and are tightened to firmly affix the adjustment bracket 14 to the bed foundation 10. As has been explained, the use of the horizontal elongated slots 28 allows some horizontal adjustment in the ultimate alignment and affixation of the bed foundation 10 to the headboard 12.

The adjustment plate 14 also has a plurality of vertical elongated slots 32 that are used to make the connection to the headboard 12 and, as can be seen, there are screws 34 that pass through the vertical elongated slots 32 and then through the holes 26 in the headboard 12 to secure the bed foundation 10 to the headboard 12. Again, the use of vertical elongated slots 32 allows a vertical alignment with the holes 26 in the headboard 12. Thus, by the aforedescribed holes and slots, the adjustment bracket 14 carries out the affixing of the bed foundation 10 to the headboard 12. It should be noted, however, that the orientation of the adjustment bracket 14 shown in FIG. 1 could be rotated 180 degrees and used with the horizontal elongated slots 28 adapted to align with the holes 26 in the headboard 12 and the vertical elongated slots 32 aligned with the threaded inserts 16.

Figure 1B:
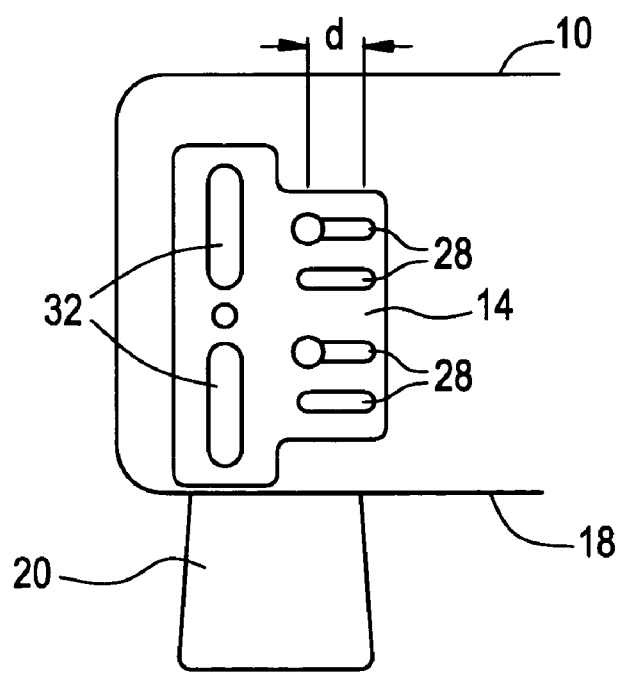
FIG. 1B is a front or head view of the bed foundation of FIG. 1 illustrating a conventional adjustment bracket affixed thereto.

Turning briefly to FIG. 1B, taken along with FIG. 1, there is a front view of the head end 18 of the bed foundation 10 with the adjustment bracket 14 affixed thereto by means of the machine screws 30. The horizontal adjustment of the adjustment bracket 14 can be seen to range along the distance "d" to align the various components prior to tightening the machine screws 30.

The use and assembly of the headboard 12 to the bed foundation 10 using the conventional adjustment bracket 14 of FIG. 1, as described, raises certain problems. As shown, the adjustment plate 14 is a relatively weak, flat stamped metal structure and which is therefore highly susceptible to bending and failure under the twisting forces that are generated between the bed foundation 10 and the headboard 12 during the use of the completed bed. Also, since the adjustment bracket 14 lays flat up against the head end 18 of the bed foundation 10, there is very little space to insert the screws 34 and manipulate those screws 34 so as to pass through the holes 26 in the headboard 12.

Figure 2:
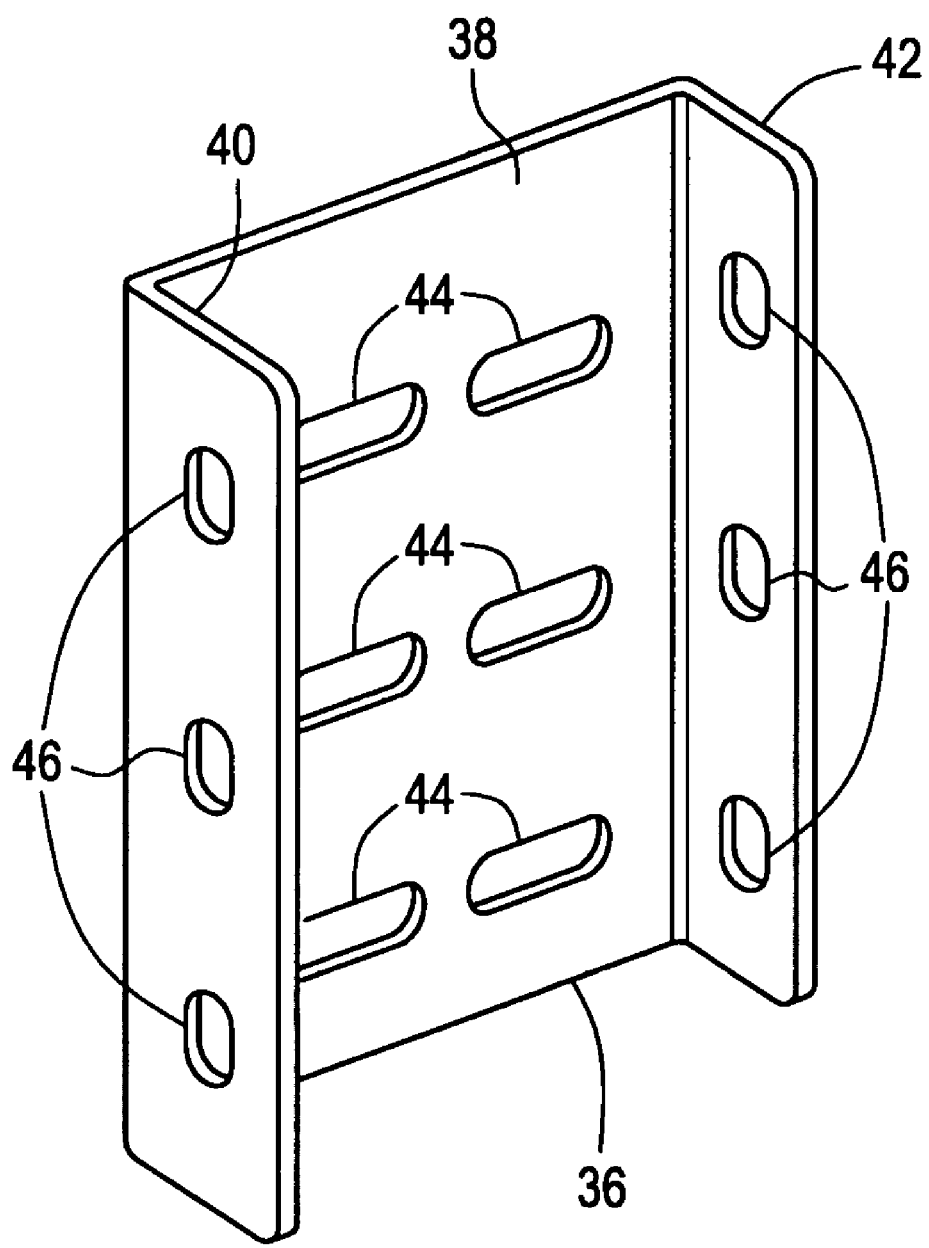
FIG. 2 is a perspective view of a foundation bracket used in carrying out the present invention.

Turning now to FIG. 2, there is shown a perspective view of a foundation bracket 36 that is used in carrying out the present invention. As can be seen, the foundation bracket 36 is generally U-shaped having a back plate 38 and laterally spaced apart side plates 40, 42 that each extend outwardly from the back plate 38 at generally right angles. The back plate 38 has two laterally spaced apart sets of horizontal elongated slots 44 vertically spaced apart. Each set consists of three horizontal elongated slots 44. As an alternative, there may be one set of horizontal elongated slots, vertically spaced apart having centers that are offset from the centerline of the foundation bracket 36. Thus, with the embodiment shown, the same foundation bracket 36 can be used with either lateral position at the far ends of the head end 18, or with the alternative embodiment, the offsetting of the horizontal elongated slots 44 allows the same foundation bracket 36 to be used at either side of the head end 18 by simply inverting the foundation bracket 36. There are also a plurality of holes 46 formed in each of the side plates 40, 42 and are paired up in horizontal alignment. As shown, there are three horizontally aligned holes 46 in each of the side plates 40, 42, however, only two of the three holes in each side plate are normally used in carrying out the present invention as will be later appreciated. The foundation bracket 36 itself can readily be formed of a stamped metal construction.

Figure 3:
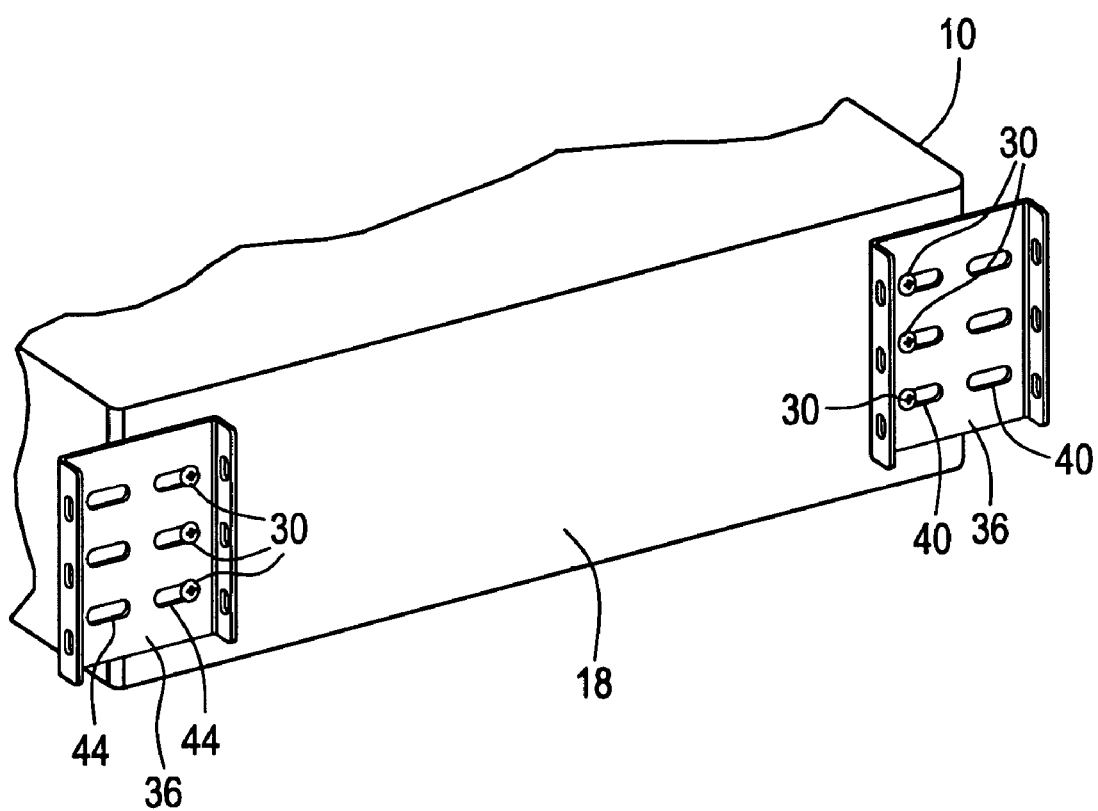
FIG. 3 is a perspective view of a pair of foundation brackets affixed to the head end of a bed foundation.

Turning now to FIG. 3, there is shown a perspective view of the head end 18 of the bed foundation 10 having foundation brackets 36 affixed thereto and it can be seen that the machine screws 30 are screwed into the threaded inserts 16 (FIG. 1) to firmly affix the foundation brackets 36 to that head end 18 of the bed foundation 10.

Figure 4:
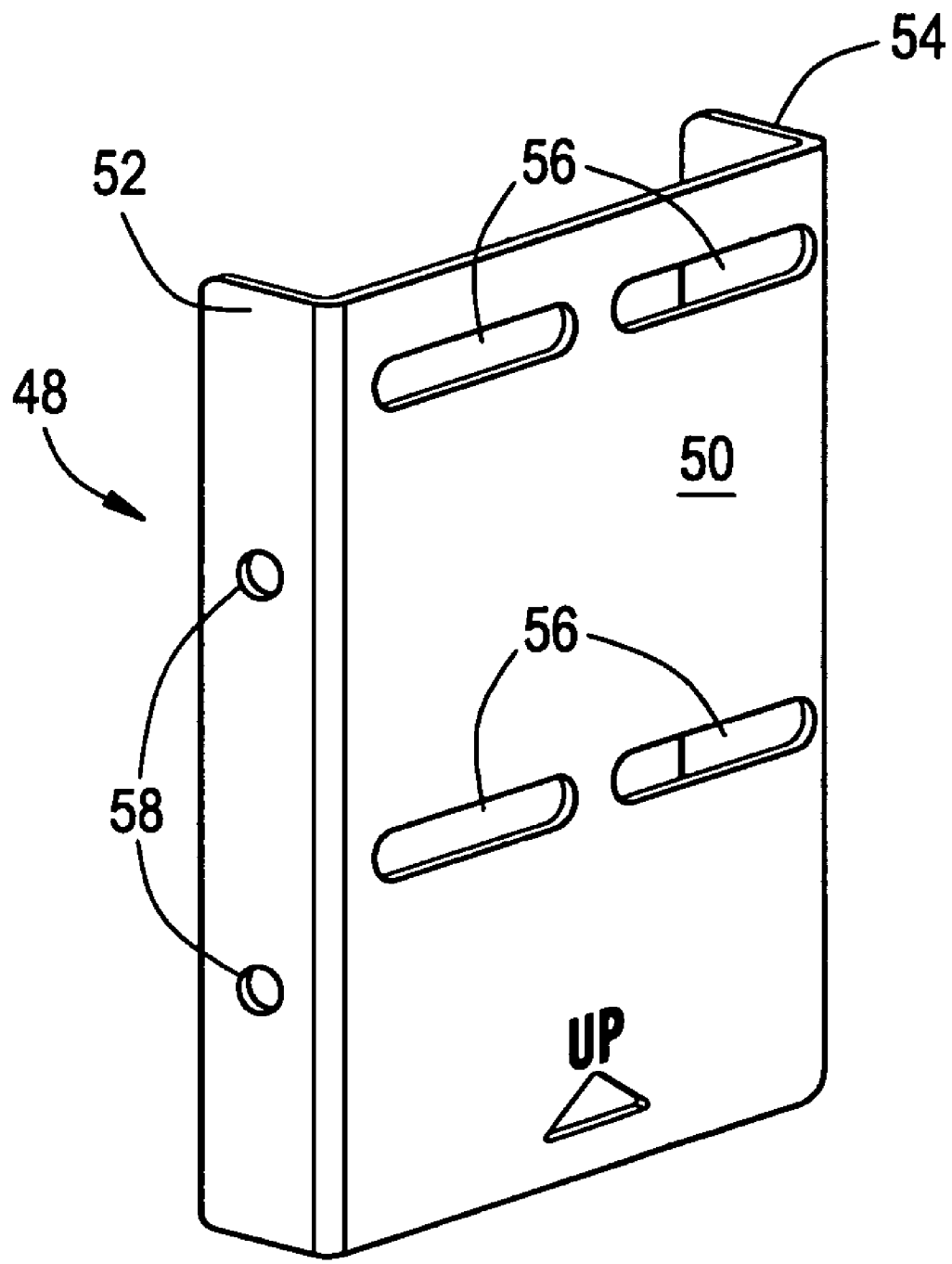
FIG. 4 is perspective view of a slide bracket used in carrying out the present invention.

Turning now to FIG. 4, there is shown a perspective view of a slide bracket 48 that is a component of the present invention. As can be seen, the slide bracket 48 is a generally U-shaped stamped metal component having a back plate 50 and laterally spaced apart side plates 52, 54. The back plate 50 has a plurality of horizontal elongated slots 56 in oppositely disposed pairs and there are holes 58 in each of the side plates 52, 54 vertically spaced apart (only the holes 58 in side plate 52 are shown).

Figure 5:
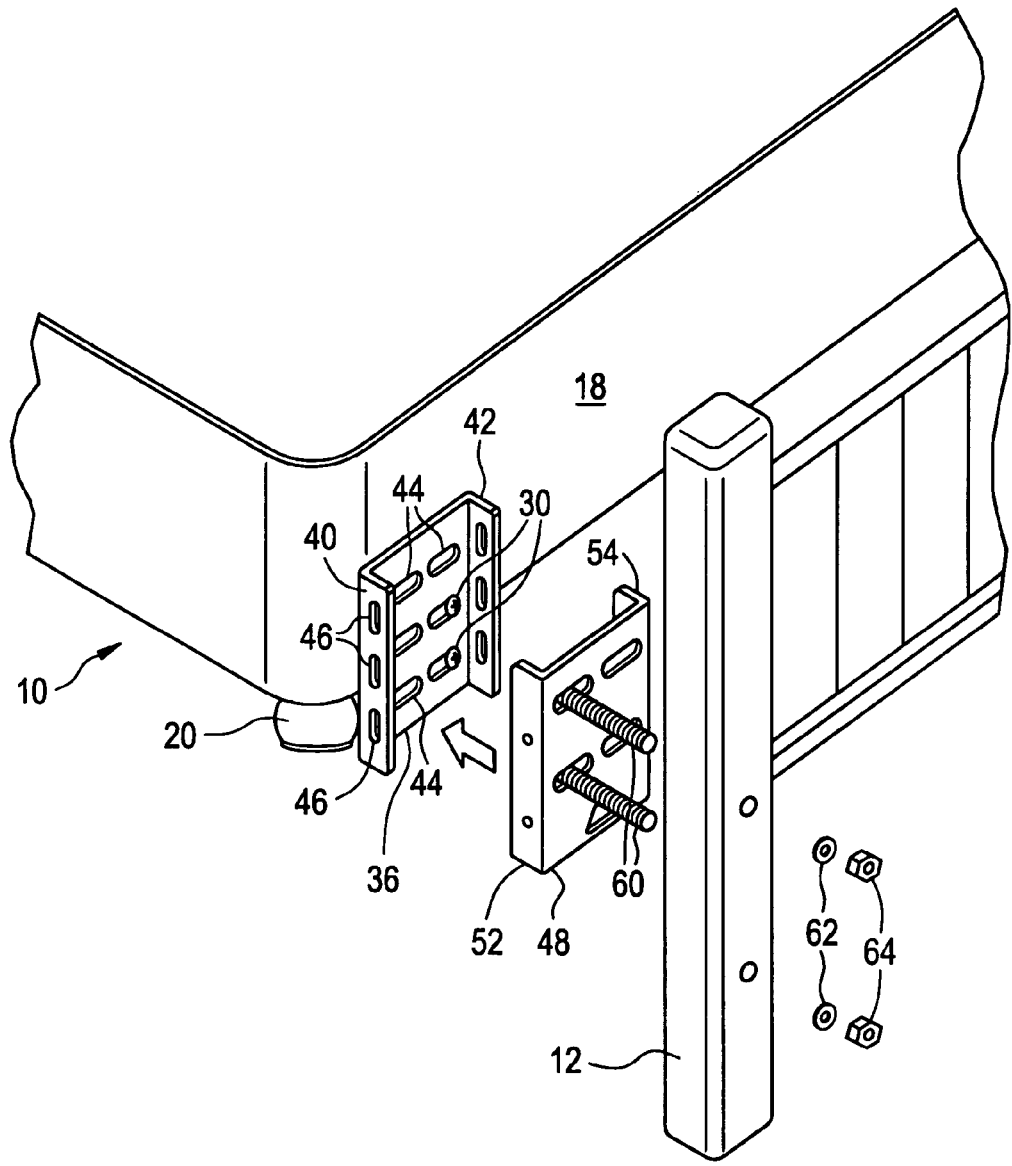
FIG. 5 is an exploded view of the bracket system of the present invention used to affix together a bed foundation and a headboard.

Turning now to FIG. 5, there is an exploded view of a bed foundation 10 shown in a position to be affixed to a headboard 12. Thus the foundation bracket 36 is affixed to the head end 18 of the bed foundation 10 by means of the machine screws 30 that are threaded into the threaded inserts 16 (FIG. 1). As shown, only the lower two of the three horizontal elongated slots 44 are used and which allows the vertical alignment of the foundation bracket 36 depending upon the particular legs 20 that are being utilized.

The slide bracket 48 is affixed to the headboard 12 by means of the screws 60, washers 62 and nuts 64 such that the slide bracket 48 is firmly affixed to the headboard 12. The nuts 64 can be cap nuts in order to present a good appearance and avoid a surface that may snag on a passerby.

As such, to the affix the headboard 12 to the bed foundation 10, the foundation bracket 36 is affixed to the slide bracket 48. That affixation is brought about by basically nesting the foundation bracket 36 within the slide bracket 48, that is, the side plates 52,54 of the slide bracket 48 overlap the side plates 40, 42 of the foundation bracket 36. At that point, securing devices are inserted through the holes 58 and through two of the vertical elongated slots 46 that is, the securing devices pass through both of the side plates 52, 54 of the slide bracket and through both of the side plates 40, 42 of the foundation brackets 36.

Figure 6A:
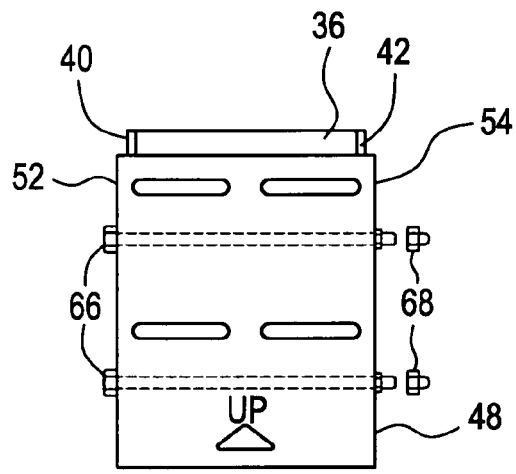
FIG. 6A-6C are end views of the present bracket system looking toward the front of the bed foundation and illustrating differing securing devices that can be used to affix the foundation bracket and the slide bracket together.
Figure 6B:
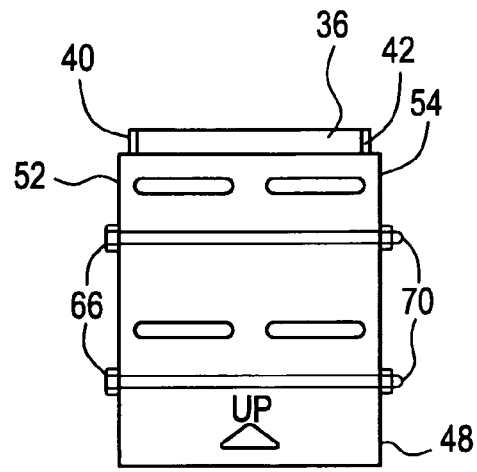
Figure 6C:
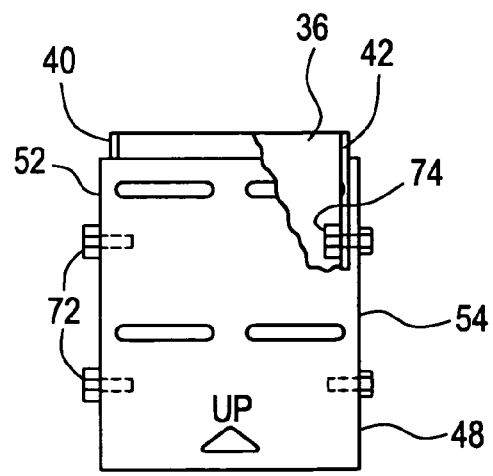

Turning to FIGS. 6A-6C, there are shown views of the bracket system of the present invention looking at the head end of the bed foundation toward the foot end and illustrating the use of various alternative securing devices that can be used with the invention. Thus, taking FIG. 6A, the securing device is a through bolt 66 that passes though the respective slide bracket 48 and the foundation bracket 36 by passing, respectively, through side plate 52, side plate 40, side plate 42 and finally, through side plate 54 where the threaded end of the through bolt 66 is secured by means of cap nuts 68. An alternative embodiment is illustrated in FIG. 6B, wherein the securing devices are also through bolts 66 but are secured therein by captured cap nuts 70 so that there is no need to provide the installer with additional nuts since cap nuts 70 are already affixed in the desired position to receive the through bolts 66. As a further alternate embodiment, there may be short bolts 72 that enter through the side plates of the slide bracket 48 and the foundation bracket 36 and are secured thereto by captured nuts 74 mounted or affixed to the internal surface of the side plates 40 and 42 of the foundation bracket 36. Other securing devices could, of course, also be used in affixing the foundation bracket 36 to the slide bracket 48, such as carriage bolts, pins and the like.

Figure 7:
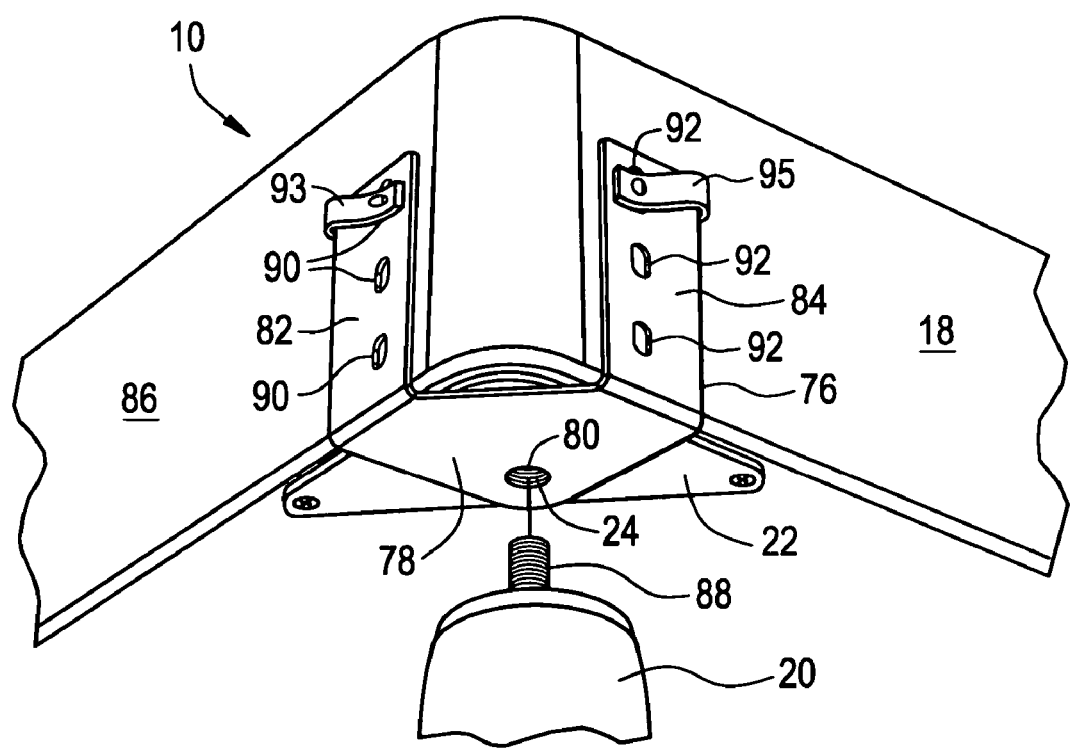
FIG. 7 is an exploded view of a further embodiment of the present invention illustrating the mounting of a foundation bracket to a bed foundation.
Figure 8:
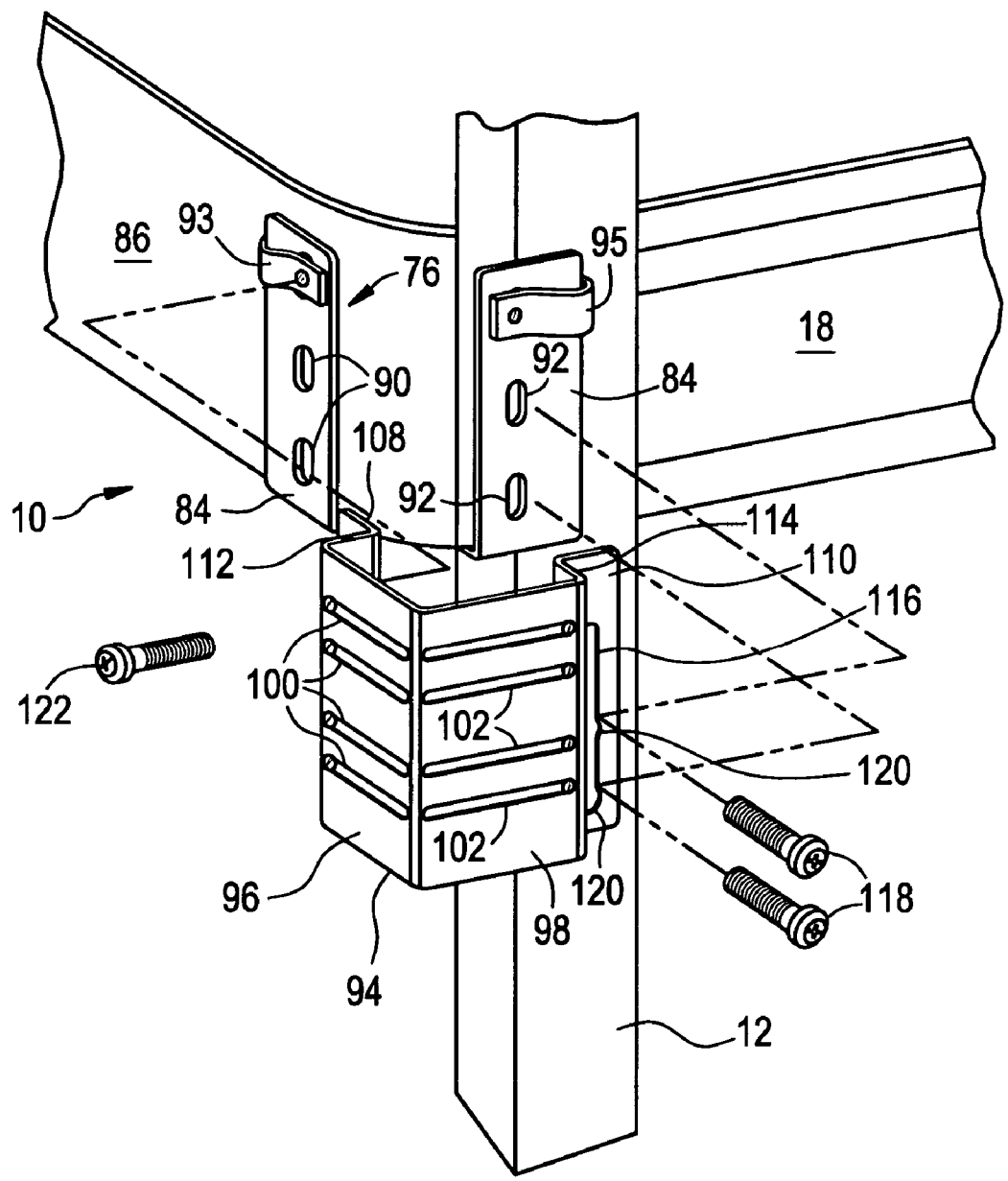
FIG. 8 is an exploded view of the present invention illustrating a slide bracket in position to be affixed thereto.

Turning now to FIG. 7, there is shown an exploded view illustrating a further embodiment of the present invention. In FIG. 7, there can be seen, a foundation bracket 76 in position to be affixed to a corner at the head end 18 of a bed foundation 10. The foundation bracket 76 comprises a lower plate 78 that is adapted to fit snugly against and underlie the corner of the bed foundation 10 and has a hole 80 formed therein. A pair of upwardly disposed side plates 82, 84 are located at both ends of the lower plate 78 and extend upwardly therefrom to fit snugly against, respectively, one of the sides 86 and the head end 18 of the bed foundation 10. The initial affixation of the foundation bracket 76 to the bed foundation 10 is by means of the leg 20 having a threaded stem 88 that passes through the hole 80 in the lower plate 78 and the threaded stem 88 of the leg 20 is screwed into the threaded hole 24 that is conventionally present in the triangular plate 22 as shown in FIG. 1A. The foundation bracket 76 has a plurality of vertical elongated slots 90, 92 formed, respectively, in the side plates 82, 84. As shown, there are three vertically spaced apart elongated slots 90, 92 in each of the side plates 82, 84 and the purpose of such slots will be later described. At the uppermost of each of the elongated slots 90, 92, formed in the side plates 82, 84, respectively, there is a Tinnerman clip 93, 95, the purpose of which will be later explained Turning now to FIG. 8, taken along with FIGS. 7 and FIG. 1, there is shown an exploded view of a bed foundation 10 shown in a position to be affixed to a headboard 12 and utilizing the foundation bracket 76 of FIG. 7. In FIG. 8, therefore, the foundation bracket 76 is affixed to the bed foundation 10 by means of the leg 20. There is also shown, a slide bracket 94 that is a generally L-shaped bracket formed as a pair of flat plates 96, 98 meeting at generally a right angle and having a plurality of vertically spaced apart, horizontal elongated slots 100, 102 formed in each of the flat plates 96, 98. As with the foundation bracket the slide bracket 94 can be formed of a single piece stamped metal construction. The flat plate 98 is affixed to the headboard 12 by means of screws (not shown) passing through two of the four illustrated horizontal elongated slots 102 formed therein and secured with nuts (not shown). Thus, as seen, the horizontal elongated slots 100 are not used in attaching the slide bracket 94 to the headboard 12 for the corner of the bed foundation 10 as shown but are present in order to have a standard bracket that can be used at all of the corners of a bed foundation.

At the outside ends of the flat plates 96, 98, there are flanges 108, 110 that are offset inwardly toward the bed foundation 10 by offset sections 112, 114. Each of the flanges 108, 110 has an elongated vertical slot formed therein (only one of which can be seen as vertical elongated slot 116) but the flange 108 has an identical elongated vertical slot. Thus, the headboard 12 can be installed to the bed foundation 10 by the use of machine screws 118 that pass through the vertical elongated slot 116 and are screwed into the threaded inserts 16 as illustrated in FIG. 1. As shown, the machine screws 118 use only the lower two of the three vertical elongated slots 92 in the foundation bracket 76.

In most cases, there will be sufficient access to the machine screws 118 to manipulate them in screwing the machine screws 118 into the threaded inserts 16, however, there may be instances that, due to the shape of the headboard 12, the assembler cannot access those machine screws sufficiently to carry out the screwing in of the machine screws into the threaded inserts 16. In such cases, there are enlarged openings 120 vertically spaced apart a predetermined distance and which are sufficiently large to allow the heads of the machine screws 118 to pass through the enlarged openings 120.

As such, and only in those specialized instances, the machine screws 118 can be partially screwed into the threaded inserts 16 while leaving a portion of the machine screws 118 not screwed into the threaded inserts 16 so that the heads of the machine screws 118 act as standoffs. To thereby attach the headboard 12 to the bed foundation 10, the headboard 12 having the slide bracket 94 affixed thereto is lifted to a position where the heads of the machine screws 118 pass through the enlarged opening 120 and the headboard 12 then lowered to capture the heads of the machine screws 118 within the elongated vertical slots formed in the flanges 108, 110.

In any event, there is also a screw 122 that assists in affixing the slide bracket 94 to the foundation bracket 76. That screw 122 is screwed into the Tinnerman clip 93 that is attached to the side plate 82 located along the side 86 of the bed foundation 10 so that the screw 122 is fastened to the Timmerman clip 93 and passes through the highest of the vertical elongated slots 90.

Figure 9:
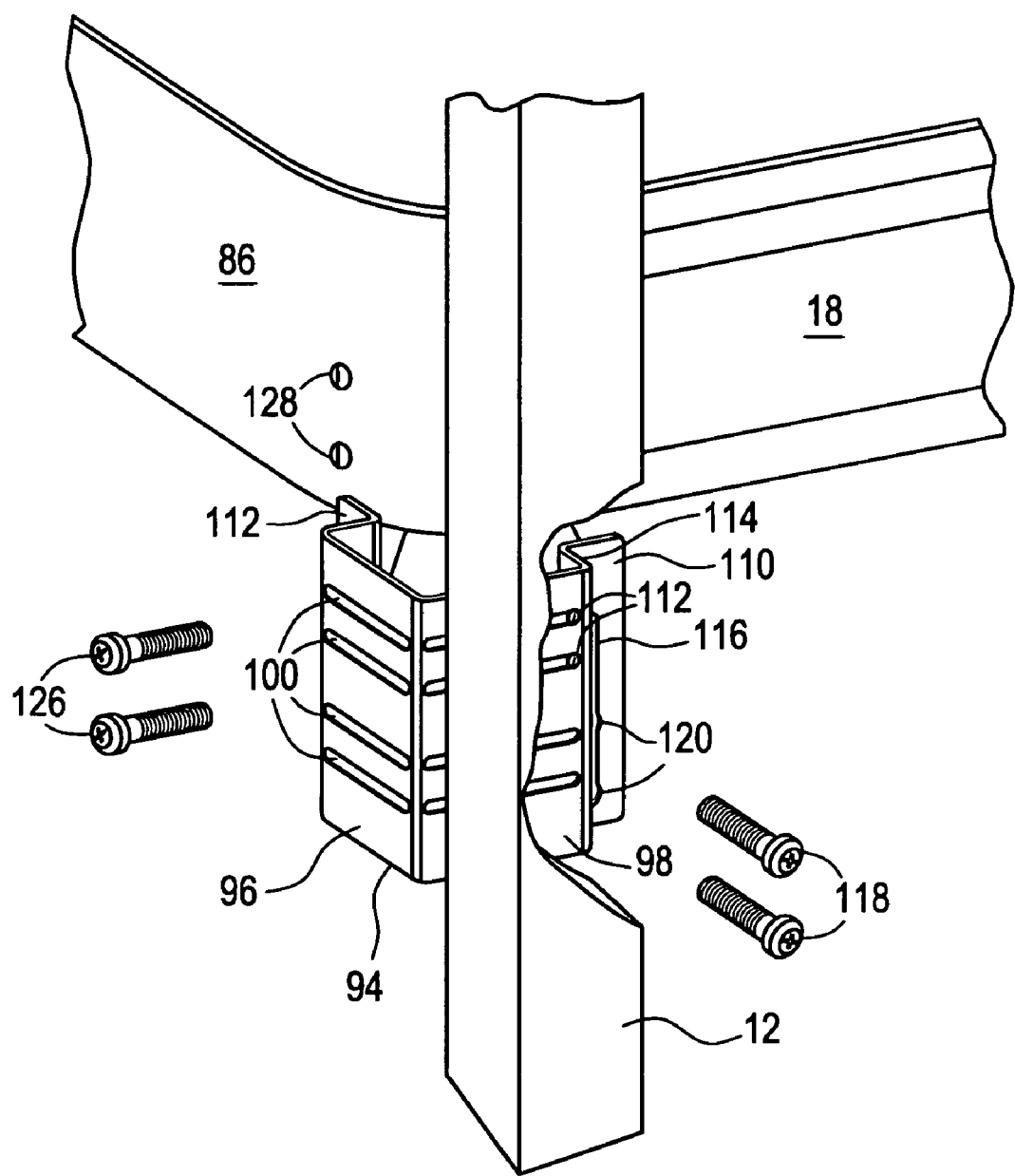
FIG. 9 is an exploded view of the present invention illustrating an alternate method of mounting the slide bracket to the bed foundation.

Turning finally to FIG. 9, taken along with FIG. 8, there is an exploded view of a still further embodiment of the bracket system of the present invention. In this embodiment, the same identification numbers have been used in FIG. 9 as were used in FIG. 8 due to the similarity of the two embodiments. In the embodiment of FIG. 9, however the foundation bracket 76 has been eliminated and two machine screws 126 are used to affix the slide bracket 94 to the side 86 of the bed foundation 10 while the machine screws 118 are used in the manner shown in FIG. 8, that is, the slide bracket 94 is affixed directly to the bed foundation 10. In this embodiment, the bed foundation 10 is of a specialized type wherein there are threaded inserts 128 along the side 86 of the bed foundation 10, otherwise, the method of attaching the headboard 12 to the bed foundation 10 is the same as described with respect to FIG. 8. With the FIG. 9 embodiment it can be seen that the slide bracket 94 is affixed to the bed foundation 10 along two vertical planes about the periphery of that bed foundation 10 and thus creates a very strong affixation for the foundation bracket.

While the present invention has been set forth in terms of a specific embodiment or embodiments, it will be understood that the bracket system herein disclosed may be modified or altered by those skilled in the art to other configurations. Accordingly, the invention is to be broadly construed and limited only by the scope and spirit of the claims appended hereto.

We claim:

1. A headboard or footboard bracket system for attaching a headboard or footboard to a bed foundation, said system comprising a foundation bracket adapted to be affixed to the bed foundation, said foundation bracket having a generally U-shaped configuration comprised of a foundation bracket base plate adapted to be affixed to the bed foundation and having two, generally vertically oriented, foundation bracket side plates extending outwardly therefrom, a slide bracket adapted to be affixed to a headboard or footboard, said slide bracket having a generally U-shaped configuration comprised of a slide bracket base plate and two, generally vertically oriented, slide bracket side plates extending outwardly therefrom, the free ends of the foundation bracket side plates and the free ends of the slide bracket side plates facing towards each other and interfitting together and at least one securing device that is adapted to pass laterally through said foundation bracket and said slide bracket to affix the foundation bracket to the slide bracket to mount the headboard or footboard to the bed foundation.

2. The bracket system as defined in claim 1 wherein the foundation bracket base plate has at least one generally horizontal elongated slot for affixing the foundation bracket to a bed foundation.

3. The bracket system as defined in claim 1 wherein each of said foundation bracket side plates has at least one hole therethrough.

4. The bracket system as defined in claim 1 wherein the slide bracket base plate has at least two generally horizontal elongated slots for affixing the slide bracket to a headboard or footboard.

5. The bracket system as defined in claim 1 wherein each of said slide bracket side plates has at least one hole therethrough.

6. The bracket system as defined in claim 1 wherein the at least one securing device comprises at least one bolt that passes through the foundation bracket and said slide bracket and is secured in position by a nut.

7. The bracket system as defined in claim 6 wherein the nut is affixed to the slide bracket.

8. The bracket system as defined in claim 6 wherein there are two bolts vertically spaced apart.

9. A bed comprising a bed foundation having a head end and having legs supporting the bed foundation from a floor, the bed including a headboard affixed to the head end of the bed, and a headboard bracket system for affixing the headboard to the bed foundation, the headboard bracket system comprising a foundation bracket affixed to the bed foundation, said foundation bracket having a generally U-shaped configuration comprised of a foundation bracket base plate adapted to be affixed to the bed foundation and having two, generally vertically oriented, foundation bracket side plates extending outwardly therefrom, a slide bracket affixed to the headboard, said slide bracket having a generally U-shaped configuration comprised of a slide bracket base plate and two, generally vertically oriented, slide bracket side plates extending outwardly therefrom, the free ends of the foundation bracket side plates and the free ends of the slide bracket side plates facing towards each other and interfitting together and at least one securing device passing laterally through the foundation bracket and the slide bracket to affix the foundation bracket to the slide bracket whereby the headboard is mounted to the bed foundation.

10. The bed as defined in claim 9 wherein the at least one securing device comprises a pair of bolts.

11. A method of assembling a headboard to a bed foundation comprising the steps of:

providing a foundation bracket, said foundation bracket having a generally U-shaped configuration comprised of a foundation bracket base plate adapted to be affixed to the bed foundation and having two, generally vertically oriented, foundation bracket side plates extending outwardly therefrom and a slide bracket, said slide bracket having a generally U-shaped configuration comprised of a slide bracket base plate and two slide bracket side plates extending outwardly therefrom;

affixing the foundation bracket to the bed foundation such that said two foundation bracket side plates are generally vertically oriented;

affixing the slide bracket to the headboard such that said two slide bracket side plates are generally vertically oriented;

nesting the foundation bracket to the slide bracket by interfitting the foundation bracket side plates and the slide bracket side plates such that the free ends of the foundation bracket side plates and the free ends of the slide bracket side are facing towards each other;

securing the foundation bracket to the slide bracket to affix the headboard to the bed foundation.

12. The method of claim 11 wherein the step of affixing the foundation bracket to the bed foundation comprises screwing screws through slots in the foundation bracket into the bed foundation.

13. A headboard or footboard bracket system for attaching a headboard or footboard to a bed foundation, said system comprising a foundation bracket adapted to be affixed to the bed foundation, said foundation bracket having a generally U-shaped configuration comprised of a foundation bracket base plate adapted to be affixed to the bed foundation and having two, generally vertically oriented, foundation bracket side plates extending outwardly therefrom, a slide bracket adapted to be affixed to a headboard or footboard, said slide bracket having a generally U-shaped configuration comprised of a slide bracket base plate and two, generally vertically oriented, slide bracket side plates extending outwardly therefrom, and at least one securing device that is adapted to pass through said foundation bracket and said slide bracket to affix the foundation bracket to the slide bracket to mount the headboard or footboard to the bed foundation, wherein the foundation bracket base plate has at least one generally horizontal elongated slot for affixing the foundation bracket to a bed foundation.

14. A headboard or footboard bracket system for attaching a headboard or footboard to a bed foundation, said system comprising a foundation bracket adapted to be affixed to the bed foundation, said foundation bracket having a generally U-shaped configuration comprised of a foundation bracket base plate adapted to be affixed to the bed foundation and having two, generally vertically oriented, foundation bracket side plates extending outwardly therefrom, a slide bracket adapted to be affixed to a headboard or footboard, said slide bracket having a generally U-shaped configuration comprised of a slide bracket base plate and two, generally vertically oriented, slide bracket side plates extending outwardly therefrom, and at least one securing device that is adapted to pass through said foundation bracket and said slide bracket to affix the foundation bracket to the slide bracket to mount the headboard or footboard to the bed foundation wherein the slide bracket base plate has at least two generally horizontal elongated slots for affixing the slide bracket to a headboard or footboard.

* * * * *